US012039707B1

(12) United States Patent
Pallerla et al.

(10) Patent No.: US 12,039,707 B1
(45) Date of Patent: Jul. 16, 2024

(54) DYNAMIC RECTIFICATION OF FINGERPRINT IMAGE PORTIONS CORRESPONDING TO DEFECTS

(71) Applicant: QUALCOMM Incorporated, San Diego, CA (US)

(72) Inventors: Rakesh Pallerla, Hyderabad (IN); Kritpal Singh Dhindhsa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/181,218

(22) Filed: Mar. 9, 2023

(51) Int. Cl.
*G06V 40/13* (2022.01)
*G06T 5/77* (2024.01)
*G06T 7/00* (2017.01)
*G06V 10/82* (2022.01)
*G06V 10/94* (2022.01)
*G06V 40/60* (2022.01)

(52) U.S. Cl.
CPC .............. *G06T 5/77* (2024.01); *G06T 7/0002* (2013.01); *G06V 10/82* (2022.01); *G06V 10/945* (2022.01); *G06V 40/13* (2022.01); *G06V 40/67* (2022.01); *G06T 2200/24* (2013.01); *G06T 2207/20084* (2013.01); *G06T 2207/20092* (2013.01)

(58) Field of Classification Search
CPC ... G06T 5/005; G06T 7/0002; G06T 2200/24; G06T 2207/20084; G06T 2207/20092; G06V 10/82; G06V 10/945; G06V 40/13; G06V 40/67
See application file for complete search history.

(56) References Cited

U.S. PATENT DOCUMENTS

| 10,572,749 | B1 * | 2/2020 | Bonev ................ G06V 40/1347 |
| 11,676,423 | B1 * | 6/2023 | Gudivada ................. G06F 3/14 |
| | | | 382/124 |
| 2021/0150682 | A1 * | 5/2021 | Sytnik ................... G06T 19/006 |

* cited by examiner

*Primary Examiner* — Jonathan A Boyd
(74) *Attorney, Agent, or Firm* — QUALCOMM Incorporated

(57) ABSTRACT

Some disclosed methods involve controlling a fingerprint sensor system to scan a portion of a user's digit and obtaining fingerprint image data corresponding to the portion of the user's digit. Some such methods involve obtaining defect data identifying one or more defective areas corresponding to an active fingerprint sensor area and determining whether the defect data indicates one or more defective areas corresponding to a touched portion of the active fingerprint sensor area from which the fingerprint image data were obtained. Some such methods involve determining, responsive to determining that the defect data indicates one or more defective areas corresponding to the touched portion, whether fingerprint image data corresponding to the one or more defective areas can be rectified and, responsive to determining that the fingerprint image data can be rectified, rectifying the fingerprint image data corresponding to the one or more defective areas.

17 Claims, 14 Drawing Sheets

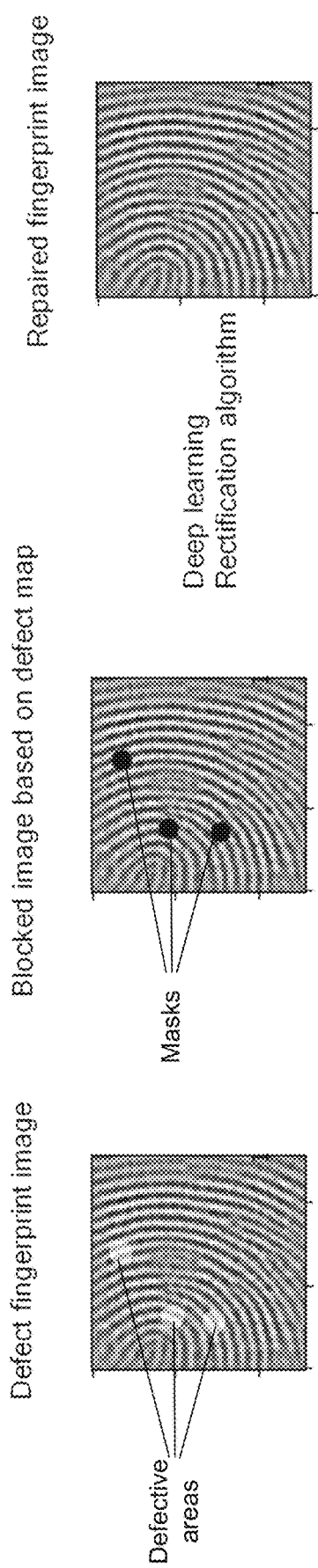
Figure 10A — Defect fingerprint image
Figure 10B — Blocked image based on defect map
Figure 10C — Repaired fingerprint image

DYNAMIC RECTIFICATION OF FINGERPRINT IMAGE PORTIONS CORRESPONDING TO DEFECTS

TECHNICAL FIELD

This disclosure relates generally to fingerprint sensor systems and relates more specifically to rectifying defects in images obtained by fingerprint sensor systems.

DESCRIPTION OF THE RELATED TECHNOLOGY

Biometric authentication can be an important feature for controlling access to devices, etc. Many existing products include some type of biometric authentication, including but not limited to fingerprint-based authentication. Although some existing fingerprint-based authentication methods and devices can provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor system, a memory system and a control system configured for communication with the fingerprint sensor system and the memory system. In some implementations, a mobile device (such as a wearable device, a cellular telephone, etc.) may be, or may include, at least part of the apparatus.

In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the fingerprint sensor system to scan a portion of a user's digit on a surface of the apparatus corresponding to a touched portion of an active fingerprint sensor area and to obtain, from the fingerprint sensor system, fingerprint image data corresponding to the portion of the user's digit. In some examples, the control system may be configured to obtain, from the memory system, defect data identifying one or more defective areas corresponding to the active fingerprint sensor area and to determine whether the defect data indicates one or more defective areas corresponding to the touched portion of the active fingerprint sensor area from which the fingerprint image data were obtained. According to some examples, responsive to determining that the defect data indicates one or more defective areas corresponding to the touched portion of the active fingerprint sensor area, the control system may be configured to determine whether fingerprint image data corresponding to the one or more defective areas can be rectified. In some examples, responsive to determining that fingerprint image data corresponding to the one or more defective areas can be rectified, the control system may be configured to rectify the fingerprint image data corresponding to the one or more defective areas.

In some examples, the apparatus may include a display system and a touch sensor system corresponding with at least a portion of the display system. According to some such examples, the control system may be configured to control the display system to present a graphical user interface (GUI). In some examples, the control system may be configured to According to some examples, the control system may be configured to obtain the defect data responsive to user input via the GUI. In some examples, the GUI may include a visual prompt asking whether a user would like to initiate a rectification process. According to some examples, the control system may be configured to control the display system to present the GUI responsive to one or more indications of decreased fingerprint sensor system performance. In some examples, the GUI may include a visual prompt to place the user's digit on a surface of the apparatus corresponding to a different portion of the active fingerprint sensor area In some such examples, the control system may be configured to control the display system to present the GUI responsive to determining that fingerprint image data corresponding to the one or more defective areas cannot be rectified.

In some examples, rectifying the fingerprint image data may involve a fingerprint image reconstruction process. According to some examples, the fingerprint image reconstruction process may be performed by a neural network implemented by the control system. In some examples, the neural network may have been trained to reconstruct fingerprint images having masked-off or missing portions. In some examples, the control system may be configured to mask fingerprint image data corresponding to the one or more defective areas prior to initiating the fingerprint image reconstruction process.

According to some examples, the control system may be configured to obtain the defect data and to store the defect data in the memory system. In some examples, obtaining the defect data may involve controlling the fingerprint sensor system to obtain multiple fingerprint sensor images. Each of the fingerprint sensor images may have been obtained with a different set of fingerprint sensor settings. In some such examples, obtaining the defect data may involve comparing the multiple fingerprint sensor images to identify one or more defective areas corresponding to the active fingerprint sensor area.

Other innovative aspects of the subject matter described in this disclosure may be implemented in a method. In some examples, the method may involve controlling a fingerprint sensor system to scan a portion of a user's digit on a surface of an apparatus corresponding to a touched portion of an active fingerprint sensor area and obtaining, from the fingerprint sensor system, fingerprint image data corresponding to the portion of the user's digit. According to some examples, the method may involve obtaining, from a memory system, defect data identifying one or more defective areas corresponding to the active fingerprint sensor area and determining whether the defect data indicates one or more defective areas corresponding to the touched portion of the active fingerprint sensor area from which the fingerprint image data were obtained.

In some examples, the method may involve, responsive to determining that the defect data indicates one or more defective areas corresponding to the touched portion of the active fingerprint sensor area, determining whether fingerprint image data corresponding to the one or more defective areas can be rectified. According to some examples, the method may involve, responsive to determining that fingerprint image data corresponding to the one or more defective areas can be rectified, rectifying the fingerprint image data corresponding to the one or more defective areas.

In some examples, the method may involve controlling a display system to present a graphical user interface (GUI). According to some examples, the method may involve obtaining the defect data responsive to user input via the GUI. In some examples, the GUI may include a visual prompt asking whether a user would like to initiate a rectification process. According to some examples, the method may involve controlling the display system to present the GUI responsive to one or more indications of decreased fingerprint sensor system performance.

According to some examples, the method may involve obtaining the defect data and storing the defect data in the memory system. In some examples, rectifying the fingerprint image data may involve a fingerprint image reconstruction process.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve controlling a fingerprint sensor system to scan a portion of a user's digit on a surface of an apparatus corresponding to a touched portion of an active fingerprint sensor area and obtaining, from the fingerprint sensor system, fingerprint image data corresponding to the portion of the user's digit. According to some examples, the method may involve obtaining, from a memory system, defect data identifying one or more defective areas corresponding to the active fingerprint sensor area and determining whether the defect data indicates one or more defective areas corresponding to the touched portion of the active fingerprint sensor area from which the fingerprint image data were obtained.

In some examples, the method may involve, responsive to determining that the defect data indicates one or more defective areas corresponding to the touched portion of the active fingerprint sensor area, determining whether fingerprint image data corresponding to the one or more defective areas can be rectified. According to some examples, the method may involve, responsive to determining that fingerprint image data corresponding to the one or more defective areas can be rectified, rectifying the fingerprint image data corresponding to the one or more defective areas.

In some examples, the method may involve controlling a display system to present a graphical user interface (GUI). According to some examples, the method may involve obtaining the defect data responsive to user input via the GUI. In some examples, the GUI may include a visual prompt asking whether a user would like to initiate a rectification process. According to some examples, the method may involve controlling the display system to present the GUI responsive to one or more indications of decreased fingerprint sensor system performance.

According to some examples, the method may involve obtaining the defect data and storing the defect data in the memory system. In some examples, rectifying the fingerprint image data may involve a fingerprint image reconstruction process.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 10A, 10B and 10C show examples of fingerprint images before and after a fingerprint image reconstruction process.

DETAILED DESCRIPTION

Figure 1:
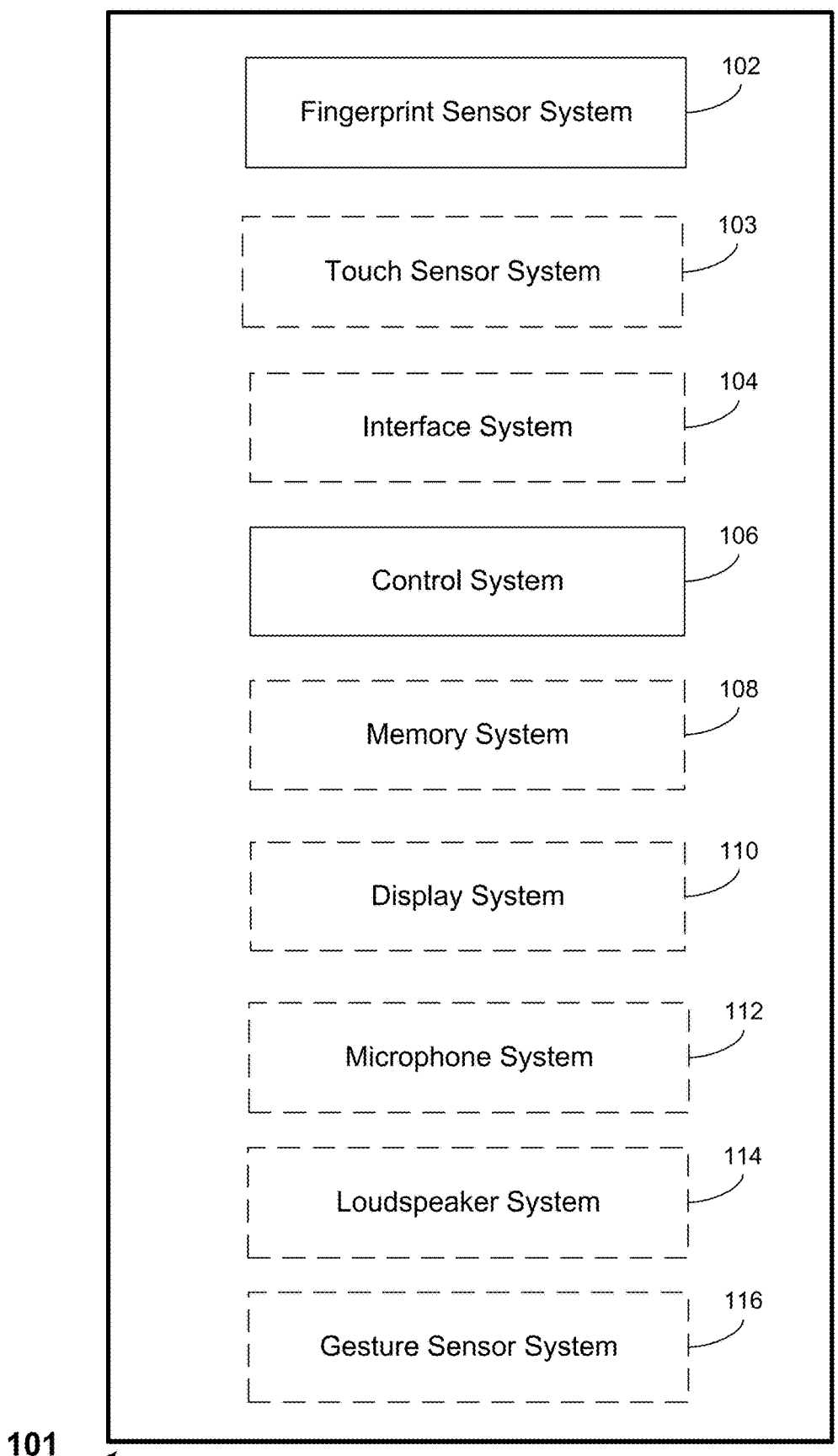
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many devices, including but not limited to mobile devices, are configured to implement fingerprint-based authentication. It has become very common to use fingerprint-based authentication to unlock a device, such as a cellular telephone, multiple times per day. Fingerprint-based authentication is commonly implemented using a fingerprint sensor system located below a display. In such devices, fingerprint sensor system performance will be degraded if there are any scratches, cracks or defects in the overlying display stack, or in a protective layer on the display screen, which may be caused by wear and tear over the time of usage. For devices that include large area fingerprint sensors, there is an increased chance of such defects impacting fingerprint sensor system performance due to the relatively larger area being scanned.

Some disclosed methods involve controlling a fingerprint sensor system to scan a portion of a user's digit and obtaining fingerprint image data corresponding to the portion of the user's digit. Some such methods involve obtaining defect data identifying one or more defective areas corresponding to an active fingerprint sensor area and determining whether the defect data indicates one or more defective areas corresponding to a touched portion of the active fingerprint sensor area from which the fingerprint image data were obtained. Some such methods involve determining, responsive to determining that the defect data indicates one or more defective areas corresponding to the touched portion, whether fingerprint image data corresponding to the one or more defective areas can be rectified and, responsive to determining that the fingerprint image data can be rectified, rectifying the fingerprint image data corresponding to the one or more defective areas. In some examples, responsive to determining that fingerprint image data corresponding to the one or more defective areas cannot be rectified, a user may be prompted to place the user's digit in different portion of the active fingerprint sensor area.

Particular aspects of the subject matter described in this disclosure may be implemented to realize one or more of the following potential advantages. Some disclosed methods can rectify the fingerprint image data obtained in an area of a device that has been damaged, obtained in an area that includes defects in a fingerprint sensor system or an overlying display screen, or combinations thereof. According to some examples, the false rejection rate (FRR) may be reduced by rectifying the fingerprint image data. In some alternative examples, a user may be prompted to use a different portion of an active fingerprint sensor area responsive to determining that fingerprint image data corresponding to a defective area cannot be rectified. Causing a person to use a fingerprint sensor area lacking defects—or at least lacking rectifiable defects—can also reduce the FRR. In some examples, less power is wasted because the fingerprint sensor system does not need to perform as many scans, due to the reduction in FRR. Performing relatively fewer scans also may prolong the useful lifetime of a fingerprint sensor system. The reduction in FRR can also improve the user experience.

FIG. 1 is a block diagram that shows example components of an apparatus according to some disclosed implementations. In this example, the apparatus 101 includes a fingerprint sensor system 102 and a control system 106. Some implementations may include a touch sensor system 103, an interface system 104, a memory system 108, a display system 110, a microphone system 112, a loudspeaker system 114, a gesture sensor system 116, or combinations thereof.

According to some examples, the fingerprint sensor system 102 may be, or may include, an ultrasonic fingerprint sensor system. Alternatively, or additionally, in some implementations the fingerprint sensor system 102 may be, or may include, another type of fingerprint sensor, such as an optical fingerprint sensor, a capacitive fingerprint sensor, a thermal fingerprint sensor, etc. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the display system 110, the microphone system 112, the loudspeaker system 114, the gesture sensor system 116, or combinations thereof may be considered to be components of the interface system 104, even though these components are shown as separate blocks in FIG. 2. In some examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the fingerprint sensor system 102, the touch sensor system 103, the memory system 108, the display system 110, the microphone system 112 and/or the loudspeaker system 114.

Accordingly, some examples of the apparatus 101 may include dedicated components that are configured for controlling at least a portion of the fingerprint sensor system 102, for processing fingerprint image data received from the fingerprint sensor system 102, or combinations thereof. Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

In some implementations, the apparatus 101 may include a gesture sensor system 116. The gesture sensor system 116 may be, or may include, an ultrasonic gesture sensor system, an optical gesture sensor system or any other suitable type of gesture sensor system.\

According to some implementations, the control system 106 may be configured to control the fingerprint sensor system 102 to scan a portion of a user's digit on a surface of the apparatus 101 corresponding to a touched portion of an active fingerprint sensor area. Examples of active fingerprint sensor area are shown and described herein. In some implementations, the control system 106 may be configured to obtain, from the fingerprint sensor system 102, fingerprint image data corresponding to the portion of the user's digit. According to some implementations, the control system 106 may be configured to obtain, from the memory system 108, defect data identifying one or more defective areas corresponding to the active fingerprint sensor area. In some implementations, the control system 106 may be configured to determine whether the defect data indicates one or more defective areas corresponding to the touched portion of the active fingerprint sensor area from which the fingerprint image data were obtained.

Responsive to determining that the defect data indicates one or more defective areas corresponding to the touched portion of the active fingerprint sensor area, in some examples the control system 106 may be configured to determine whether fingerprint image data corresponding to the one or more defective areas can be rectified and, responsive to determining that the fingerprint image data corresponding to the one or more defective areas can be rectified, rectifying the fingerprint image data corresponding to the one or more defective areas.

In some implementations, responsive to determining that fingerprint image data corresponding to the one or more defective areas cannot be rectified, the control system 106 may be configured to provide a prompt to place the user's digit on a surface of the apparatus corresponding to a different portion of the active fingerprint sensor area. In some such implementations, the control system 106 may be configured to control the display system 110, the loudspeaker 114, or both, to provide the prompt.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, a watch, an armband, a wristband, a ring, a headband, an earbud or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
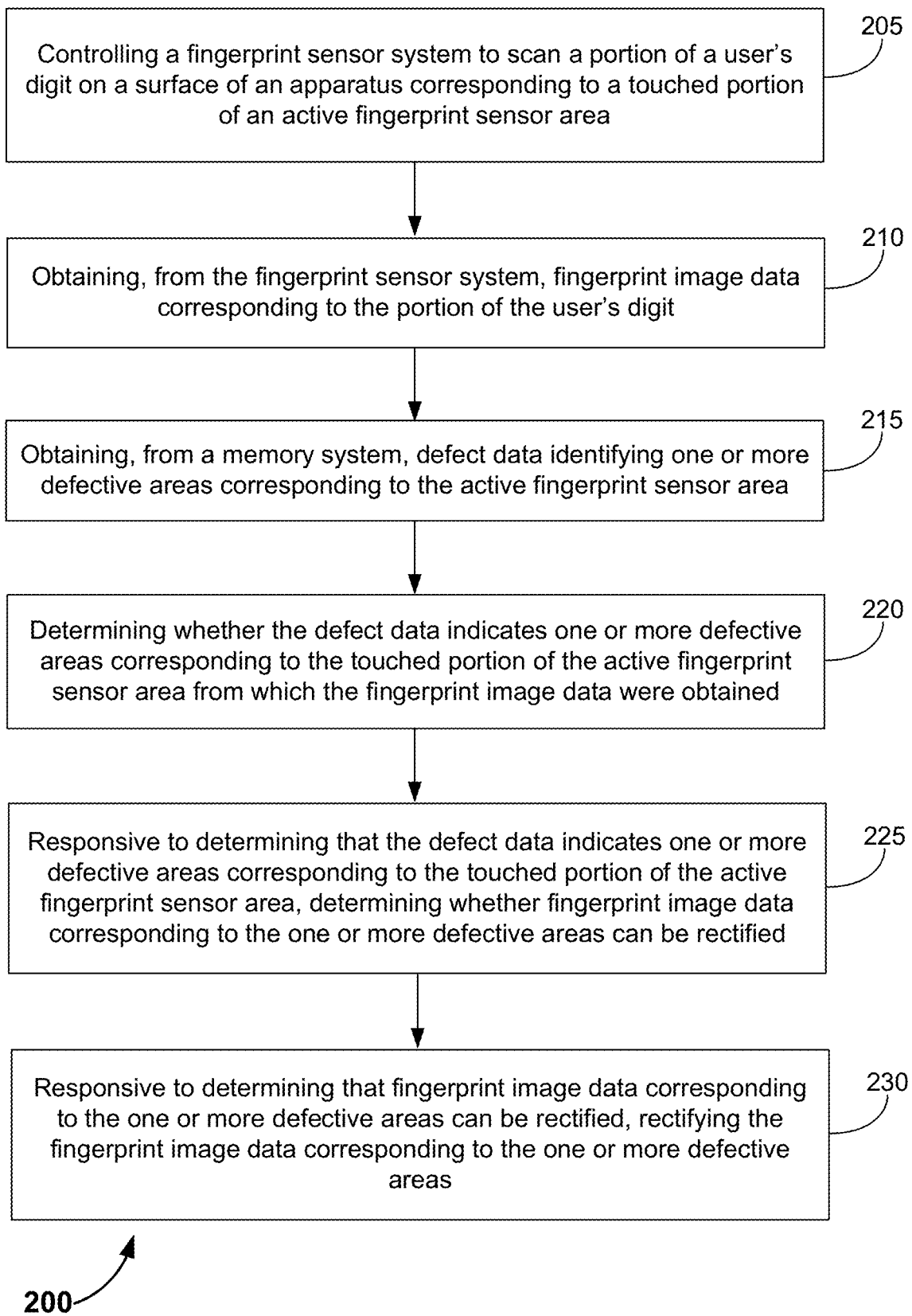
FIG. 2 is a flow diagram that presents examples of operations according to some disclosed methods.

FIG. 2 is a flow diagram that presents examples of operations according to some disclosed methods. The blocks of FIG. 2 may be performed by an apparatus that includes at least a fingerprint sensor system and a control system. The blocks of FIG. 2 may, for example, be performed by the apparatus 101 of FIG. 1 or by a similar apparatus. For example, in some implementations the control system 106 of FIG. 1 may be configured to perform, at least in part, the operations that are described herein with reference to FIG. 2. In some examples, the apparatus may be a mobile device, such as a cellular telephone. However, in other examples, the apparatus may be another type of device, such as a tablet, a laptop, an automobile or component thereof, a door access control device, a wearable device, etc. As with other methods disclosed herein, the methods outlined in FIG. 2 may include more or fewer blocks than indicated. Moreover, the blocks of methods disclosed herein are not necessarily performed in the order indicated. In some implementations, one or more blocks may be performed concurrently.

According to this example, method 200 is a method of controlling a fingerprint sensor system. In this example, block 205 involves controlling a fingerprint sensor system to scan a portion of a user's digit on a surface of the apparatus corresponding to a touched portion of an active fingerprint sensor area. In some examples, the control system 106 of FIG. 1 may control the fingerprint sensor system 102 to scan the portion of the user's digit. The digit may be on a touched portion of a surface of an instance of the apparatus 101, in an active fingerprint sensor area of the fingerprint sensor system 102. In this example, block 210 involves obtaining, from the fingerprint sensor system, fingerprint image data corresponding to the portion of the user's digit.

According to this example, block 215 involves obtaining, from a memory system, defect data identifying one or more defective areas corresponding to the active fingerprint sensor area. The one or more defective areas may be, or may include, defective display areas, damaged or unclean areas of a cover glass or an overlying protective film, defective sensor pixels of the fingerprint sensor system 102, other defects, or combinations thereof. In some examples, method 200 may involve obtaining the defect data and storing the defect data in the memory system. Some methods of obtaining defect data are disclosed herein.

In some examples, the control system 106 may be configured to perform the operations of block 215 and obtain the defect data responsive to user input. The user input may, for example, be received via a graphical user interface (GUI) that the control system 106 causes the display system 110 to present. The GUI may, for example, include a visual prompt asking whether a user would like to initiate a rectification process. Some examples of relevant GUIs are provided in this disclosure, such as the GUI shown in FIG. 4. The user input may, for example, be received in the form of touch sensor data from an area of the touch sensor system 103 corresponding with the displayed GUI. According to some examples, the control system 106 may be configured to control the display system 110 to present the GUI responsive to one or more indications of decreased fingerprint sensor system performance.

Accordingly, in some examples some or all blocks of method 200 may be performed responsive to fingerprint sensor system performance that is at or below a fingerprint sensor system performance threshold. In some examples, the fingerprint sensor system performance threshold may correspond to a false rejection rate (FRR) threshold. Alternatively, or additionally, in some examples the fingerprint sensor system performance threshold may correspond to an image quality threshold, a signal-to-noise ratio threshold, or combinations thereof.

In this example, block 220 involves determining whether the defect data indicates one or more defective areas corresponding to the touched portion of the active fingerprint sensor area from which the fingerprint image data were obtained. For example, the control system may be configured to determine, based on defect location information associated with the defect data, whether defect locations of one or more defects are within an area of the touched portion of the active fingerprint sensor area.

According to this example, block 225 involves, responsive to determining that the defect data indicates one or more defective areas corresponding to the touched portion of the active fingerprint sensor area, determining whether fingerprint image data corresponding to the one or more defective areas can be rectified. In some examples, block 230 may involve performing a rectification process involving the one or more defective areas corresponding to the touched portion of the active fingerprint sensor area. Rectifying the fingerprint image data may, for example, involve one or more of the fingerprint image reconstruction process that are disclosed herein.

Figure 3:
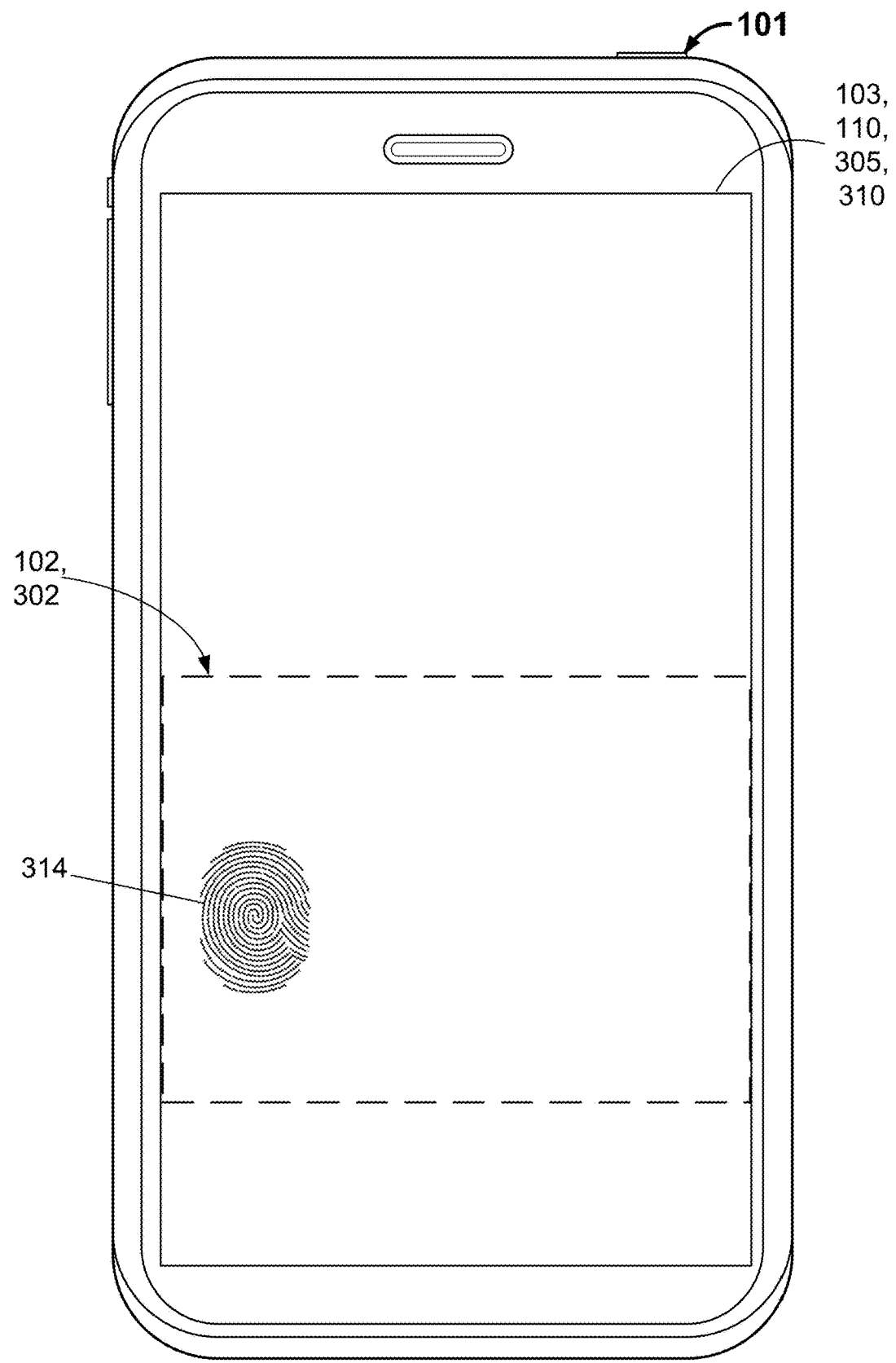
FIG. 3 shows an example of an apparatus configured to perform at least some disclosed methods.

FIG. 3 shows an example of an apparatus configured to perform at least some disclosed methods. As with other disclosed examples, the types, numbers and arrangements of elements that are shown in FIG. 3 are merely presented by way of example. Other examples may include different types of elements, numbers of elements, arrangements of elements, or combinations thereof.

In this example, the apparatus 101 is an instance of the apparatus 101 of FIG. 1. In this implementation, the apparatus 101 is a mobile device that includes a fingerprint sensor system 102, a control system 106 (not shown in FIG. 3) and a display system 110. The fingerprint sensor system 102 may be, or may include, an ultrasonic fingerprint sensor, an optical fingerprint sensor, or another type of fingerprint sensor. The mobile device may, for example, be a cell phone.

According to this example, an active fingerprint sensor area 302 of the fingerprint sensor system 102 is outlined in large dashes. The active fingerprint sensor area 302 may, for example, be an area that includes an array of fingerprint sensor pixels of the fingerprint sensor system 102. The array of fingerprint sensor pixels may include receiver pixels, transceiver pixels, etc., depending on the type of fingerprint sensor and the particular implementation. According to this example, the active fingerprint sensor area 302 corresponds with less than half of the display area 310 of the display system 110. In alternative implementations, the active fingerprint sensor area 302 may correspond with a larger portion or a smaller portion of the display area 310.

In this example, an active area of the touch sensor system 103 is coextensive with the display area 310. According to this example, a cover stack 305 resides on the active area of the touch sensor system 103 and the display area 310. In this example, the cover stack 305 includes at least a cover glass. In some examples, the cover stack 305 may include at least one protective film layer. According to this example, the active fingerprint sensor area 302 resides below the cover stack 305, the display area 310 and the active area of the touch sensor system 103. In other words, the display area 310 and the active area of the touch sensor system 103 reside between the active fingerprint sensor area 302 and the cover stack 305.

FIG. 3 also shows an example of a touched portion 314 that is within the active fingerprint sensor area 302. According to this example, the touched portion 314 indicates an area of a digit, or a digit-like target object, in contact with an outer surface of the apparatus 101 within the active fingerprint sensor area 302. In some examples, the touched portion 314, or another touched portion, may be referred to herein as "a touched portion of an active fingerprint sensor area," even though a digit touching the apparatus 101 within the active fingerprint sensor area 302 will normally be touching a layer that is between the digit and the active fingerprint sensor area 302, such as a cover glass layer, a protective film layer, etc.

Figure 4:
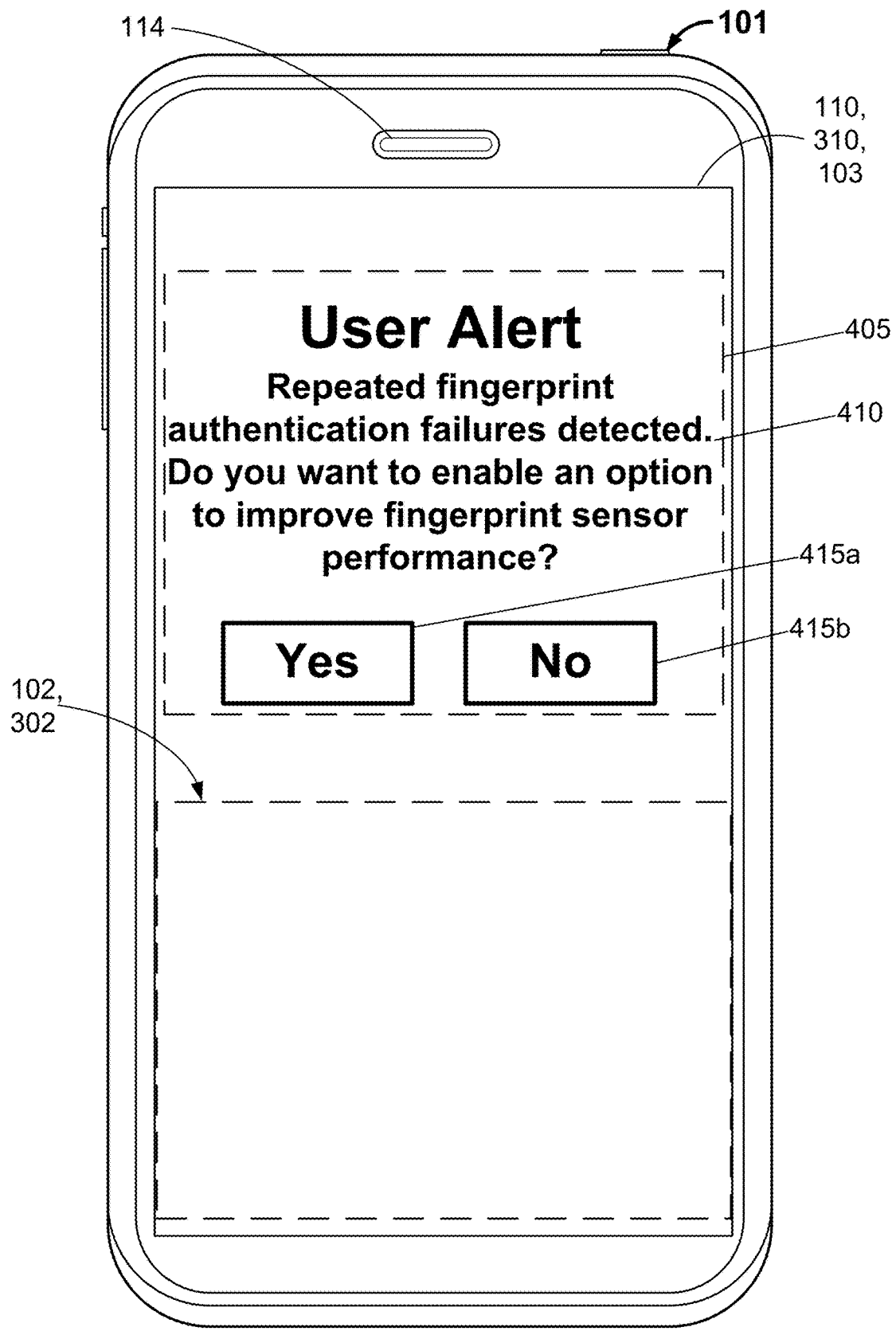
FIG. 4 shows an example of a graphical user interface (GUI) that may be provided according to some disclosed methods.

FIG. 4 shows an example of a graphical user interface (GUI) that may be provided according to some disclosed methods. As with other disclosed examples, the types, numbers and arrangements of elements that are shown in FIG. 4 are merely presented by way of example. Other examples may include different types of elements, numbers of elements, arrangements of elements, or combinations thereof.

In this example, the apparatus 101 is an instance of the apparatus 101 of FIG. 1 and includes the elements that are described with reference to FIG. 3. According to this example, a control system (not shown) of the apparatus 101 is controlling the display system 110 to present a GUI 405. According to this example, the control system is configured to present the GUI 405—or a similar GUI—responsive to one or more indications that the fingerprint sensor system performance is at or below a fingerprint sensor system performance threshold, such as a threshold number of failed authentication attempts, a false rejection rate threshold, an image quality threshold, or combinations thereof.

According to this example, the GUI 405 includes a textual portion 410 and virtual buttons 415a and 415b. Here, the textual portion 410 indicates that repeated fingerprint authentication failures have been detected and asks whether the user wants to enable an option to improve fingerprint sensor performance. In some examples, the control system may be configured to control the loudspeaker system 114 to provide one or more audio messages, which may correspond with the text of the textual portion 410. A user may provide a response to the textual portion 410, an audio prompt or a combination thereof by touching the virtual button 415a or the virtual button 415b. In some examples, a user may provide a response via a voice command received by the microphone system 112 (not shown).

Figure 5C:
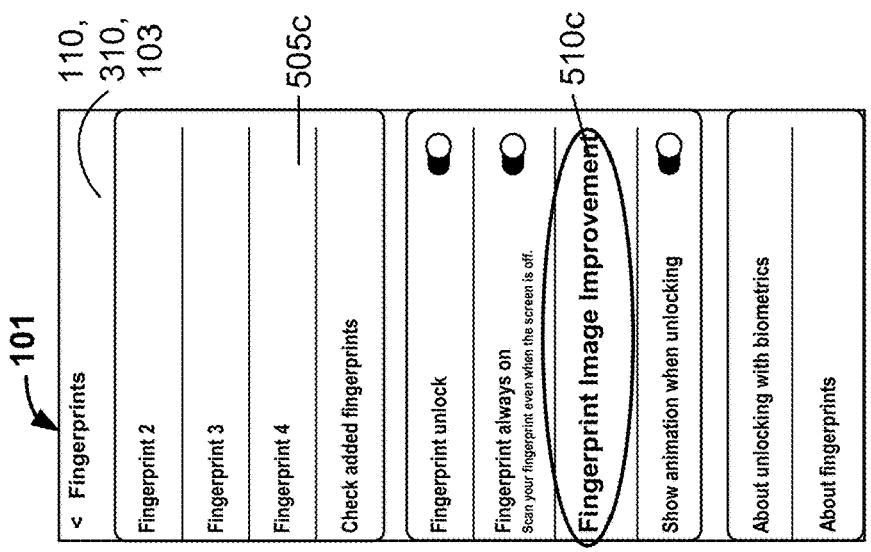
FIGS. 5A, 5B and 5C show examples of additional GUIs that may be provided according to some disclosed methods.
Figure 5B:
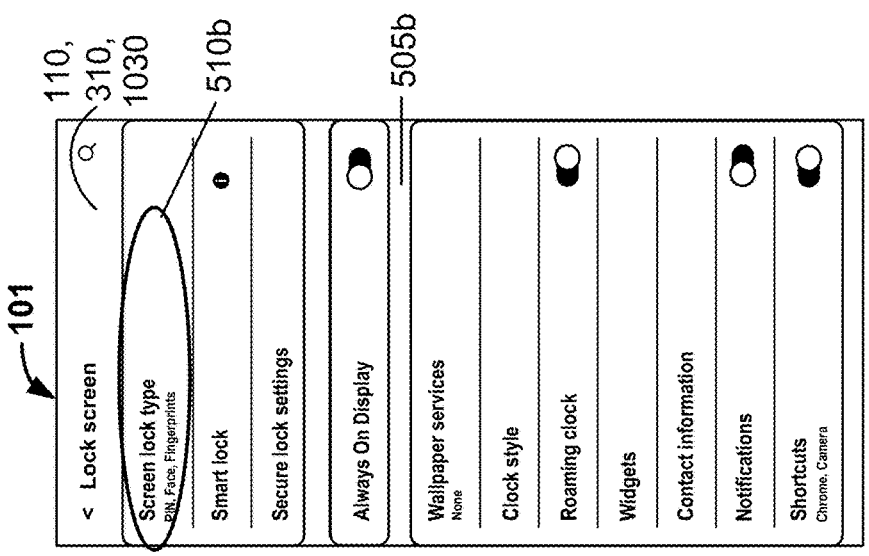
Figure 5A:
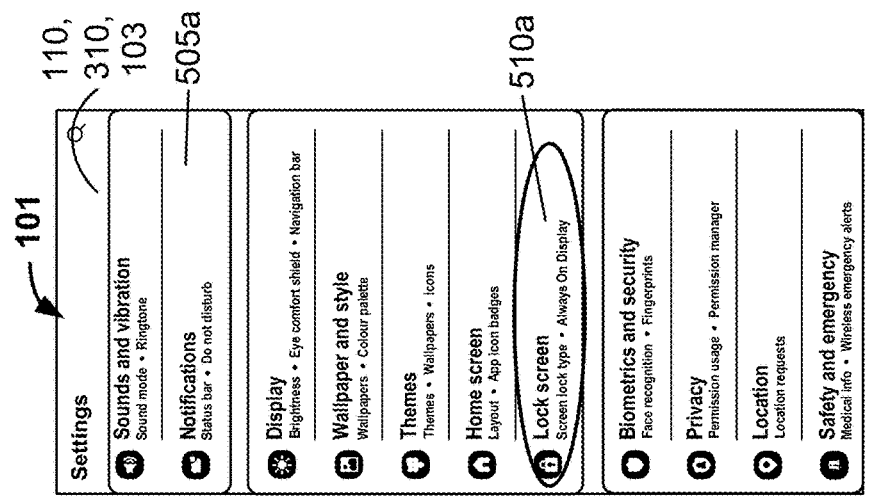

FIGS. 5A, 5B and 5C show examples of additional GUIs that may be provided according to some disclosed methods. As with other disclosed examples, the types, numbers and arrangements of elements that are shown in FIGS. 5A, 5B and 5C are merely presented by way of example. Other examples may include different types of elements, numbers of elements, arrangements of elements, or combinations thereof.

In these examples, the apparatus 101 is an instance of the apparatus 101 of FIG. 1 and includes the elements that are described with reference to FIG. 3. According to these examples, a control system (not shown) of the apparatus 101 is controlling the display system 110 to present the GUIs 505a, 505b and 505c.

The GUI 505a shown in FIG. 5A is an example of a GUI that may be presented responsive to activating a "settings" software application or "app." For example, the GUI 505a, or a similar GUI, may be presented responsive to receiving an indication from the touch sensor system 103 of a touch in the area of an icon corresponding to a settings app. According to this example, the control system is configured to cause the display system 110 to present one or more additional GUIs responsive to a user's interaction with the GUI 505a.

In this example, the control system is configured to cause the display system 110 to present the GUI 505b responsive to receiving an indication from the touch sensor system 103 of a touch in the area 510a of the GUI 505a, which corresponds to lock screen features and functionality. The GUI 505*b* includes various areas corresponding multiple types of lock screen features and functionality. In this example, the area 510*b* of the GUI 505*b* corresponds to screen lock type.

According to some examples, the control system is configured to cause the display system 110 to present the GUI 505*c* responsive to receiving an indication from the touch sensor system 103 of a touch in the area 510*b* of the GUI 505*b*. In other examples, an additional GUI may be presented responsive to receiving an indication from the touch sensor system 103 of a touch in the area 510*b* of the GUI 505*b*, after which the GUI 505*c* may or may not be presented, depending on a user's selection. For example, responsive to receiving an indication from the touch sensor system 103 of a touch in the area 510*b* of the GUI 505*b*, a GUI may be presented that allows a user to select between unlocking the apparatus 101 via fingerprint authentication and unlocking the apparatus 101 via another method, such as facial recognition, entry of an identification code, etc. In some such examples, a control system may be configured to present the GUI 505*c* responsive to receiving an indication from the touch sensor system 103 of a touch in an area corresponding to unlocking the apparatus 101 via fingerprint authentication. According to some examples, the control system may be configured to present the GUI 505*c*—or a similar GUI—responsive to receiving an indication from the touch sensor system 103 of a touch in the area of the virtual button 415*a* of FIG. 4.

According to this example, the GUI 505*c* includes various areas corresponding to fingerprint authentication. In this example, the GUI 505*c* includes an area 510*c* corresponding to fingerprint image improvement. In some examples, the control system may be configured to enable the method 200, or a similar method, responsive to receiving an indication from the touch sensor system 103 of a touch in the area 510*c*. Accordingly, the fingerprint image improvement functionality that may be enabled, or initiated, responsive to receiving an indication of a touch in the area 510*c* may include rectifying fingerprint image data corresponding to one or more defective areas of the apparatus 101, which may be defective areas of a display stack that overlies an active area of a fingerprint sensor system, damaged or unclean areas of a cover glass or an overlying protective film, defective sensor pixels of the fingerprint sensor system 102, other defects, or combinations thereof.

FIGS. 6A, 6B, 6C and 6D show examples of additional GUIs that may be provided according to some disclosed methods. As with other disclosed examples, the types, numbers and arrangements of elements that are shown in FIGS. 6A, 6B, 6C and 6D are merely presented by way of example. Other examples may include different types of elements, numbers of elements, arrangements of elements, or combinations thereof.

In these examples, the apparatus 101 is an instance of the apparatus 101 of FIG. 1 and includes the elements that are described with reference to FIG. 3. According to these examples, a control system (not shown) of the apparatus 101 is controlling the display system 110 to present the GUIs 605*a*, 605*b*, 605*c* and 605*d*.

Figure 6A:
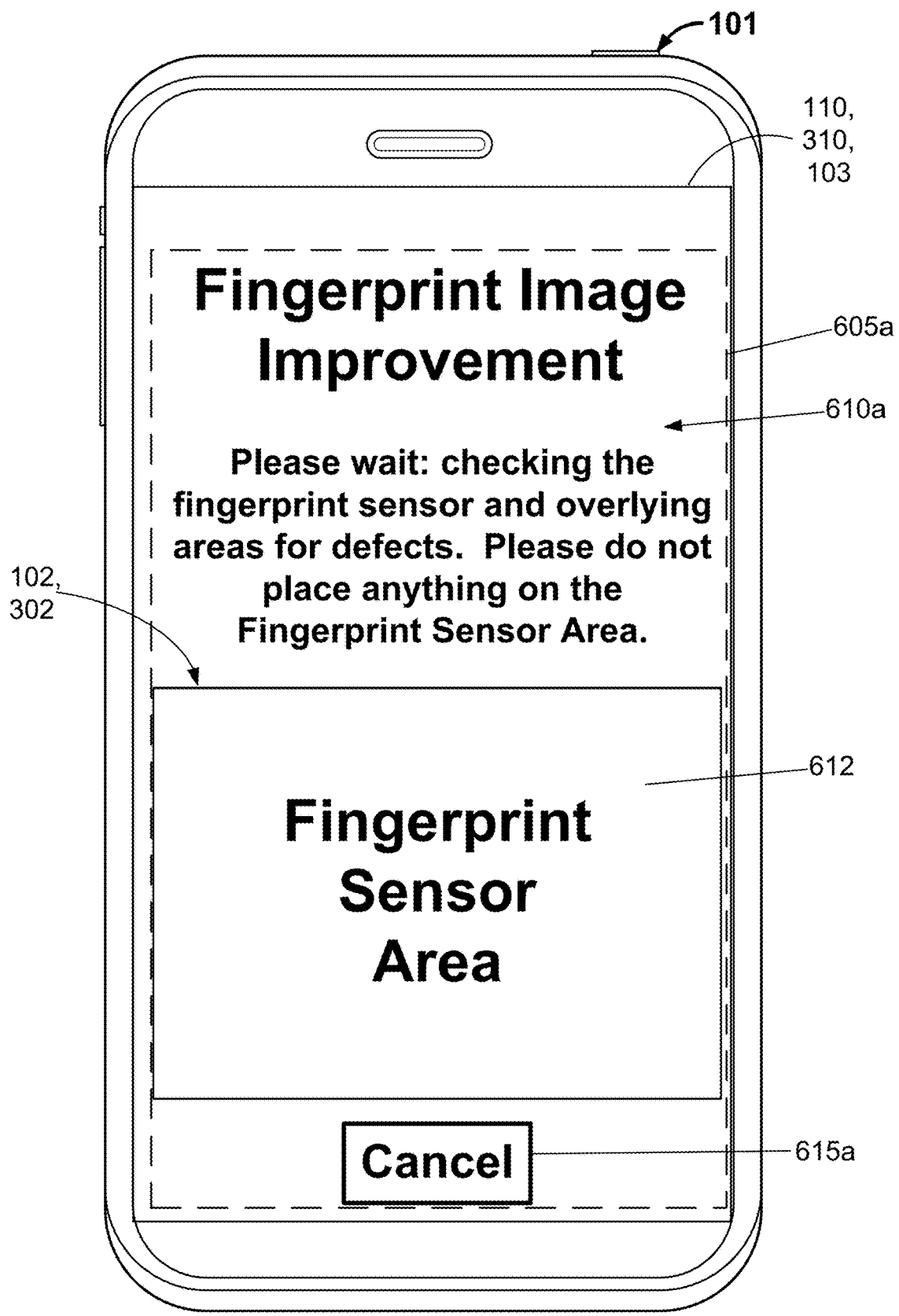
FIGS. 6A, 6B, 6C and 6D show examples of additional GUIs that may be provided according to some disclosed methods.

The GUI 605*a* shown in FIG. 6A is an example of a GUI that may be presented responsive to receiving an indication from the touch sensor system 103 of a touch in the area 510*c* of the GUI 505*c* shown in FIG. 5C. According to this example, the GUI 605*a* includes a textual portion 610*a*, a fingerprint sensor area indication 612 and a virtual button 615*a*. Here, the textual portion 610*a* indicates that a process relating to fingerprint image improvement is taking place. More specifically, the textual portion 610*a* indicates that the fingerprint sensor system 102 and overlying areas are being checked for defects and that the user should not place anything in the fingerprint sensor area 302. In some examples, the control system may be configured to control the loudspeaker system 114 to provide one or more audio messages, which may correspond with the text of the textual portion 610*a*. In this example, a user may cancel the calibration process by touching the virtual button 615*a*. In some examples, a user may provide a response via a voice command received by the microphone system 112 (not shown).

In this example, at the time that the GUI 605*a* is being presented, the control system is configured to control the fingerprint sensor system to obtain fingerprint image data for a defect detection and mapping process. According to some examples, the defect detection and mapping process may involve a process of detecting malfunctioning or "bad" fingerprint sensor pixels, detecting dead fingerprint sensor pixels, or a combination thereof. Bad and dead fingerprint sensor pixels may be referred to herein as "abnormal" fingerprint sensor pixels. Some methods of detecting abnormal fingerprint sensor pixels-which could be performed using an optical fingerprint sensor system, an ultrasonic fingerprint sensor system, or another type of fingerprint sensor system—may involve exciting pixels, building a histogram of responses of the pixels, determining a threshold and applying the threshold.

In some implementations, a control system may receive (for example, from a memory), a set of images captured by a fingerprint sensor system and construct an image by combining the set of images. In the set of images, all images are sensed with no target object present, with a first image being sensed at a selected level of illumination, and additional images being sensed (1) at full illumination, (2) at no illumination and (3) at no illumination but with a change in a parameter of the sensor, relative to the parameter's value used in sensing the other images. In the context of an ultrasonic fingerprint sensor, the "illumination" involves the transmission of ultrasonic waves by the fingerprint sensor system. The parameter can be, for example, a biasing voltage of an ultrasound sensor or a shutter speed of a camera. Subsequently, the control system may determine an intensity of normal pixels, for example as a mean or by identifying a peak in a histogram of intensities, in the constructed image. According to some examples, the just-described two steps are repeated, for example with a second image that is sensed at another selected level of illumination.

Then, the control system may compute a range, based on two or more normal intensities, which are identified as described above, by use of images of two or more selected levels of illumination. The range may then be used, with one of the normal intensities (for example, as the center of the range), to identify any pixels with intensities outside the range as abnormal pixels. In some examples, multiple ranges may be determined—for example as distances between multiple pairs of normal intensities obtained by use of multiple selected illumination levels—and followed by use of a predetermined formula (such as a linear regression) to obtain a final range that is thereafter centered at each of the normal intensities, and used to identify abnormal pixels. For example, a pixel may be classified as abnormal if values corresponding to that pixel are outside the final range.

Some examples may apply a logical condition, such as an OR condition, to combine abnormal pixels identified by the use of one normal intensity at the center of a range with abnormal pixels identified by use of another normal intensity at the center of the range. The locations of the abnormal pixels may be stored in a non-transitory memory. This is one example of "defect data" as the term is used herein. In some examples, the defect data may be used for further processing in the normal manner, for example replacing the intensity of an abnormal pixel with an average of intensities of the abnormal pixel's neighboring pixels, followed by binarization, extraction of features and matching to a library.

The foregoing examples disclose methods that are effective for detecting abnormal fingerprint sensor pixels. Defects in an overlying display stack and defects in the layer or layers on the outer surface of the display stack may be located by obtaining one or more "air images" with the fingerprint sensor system. An air image is an image obtained by the fingerprint sensor system when there is no object touching an outer surface of an apparatus that includes the fingerprint sensor system in an active fingerprint sensor area, such as the active fingerprint sensor area 302 that is described with reference to FIG. 3. Defects in an overlying display stack and defects in the layer or layers on the outer surface of the display stack also may be located by detecting static features in fingerprint image data corresponding to scratches, etc., during normal fingerprint sensor system operation (such as during authentication attempts).

Figure 6B:
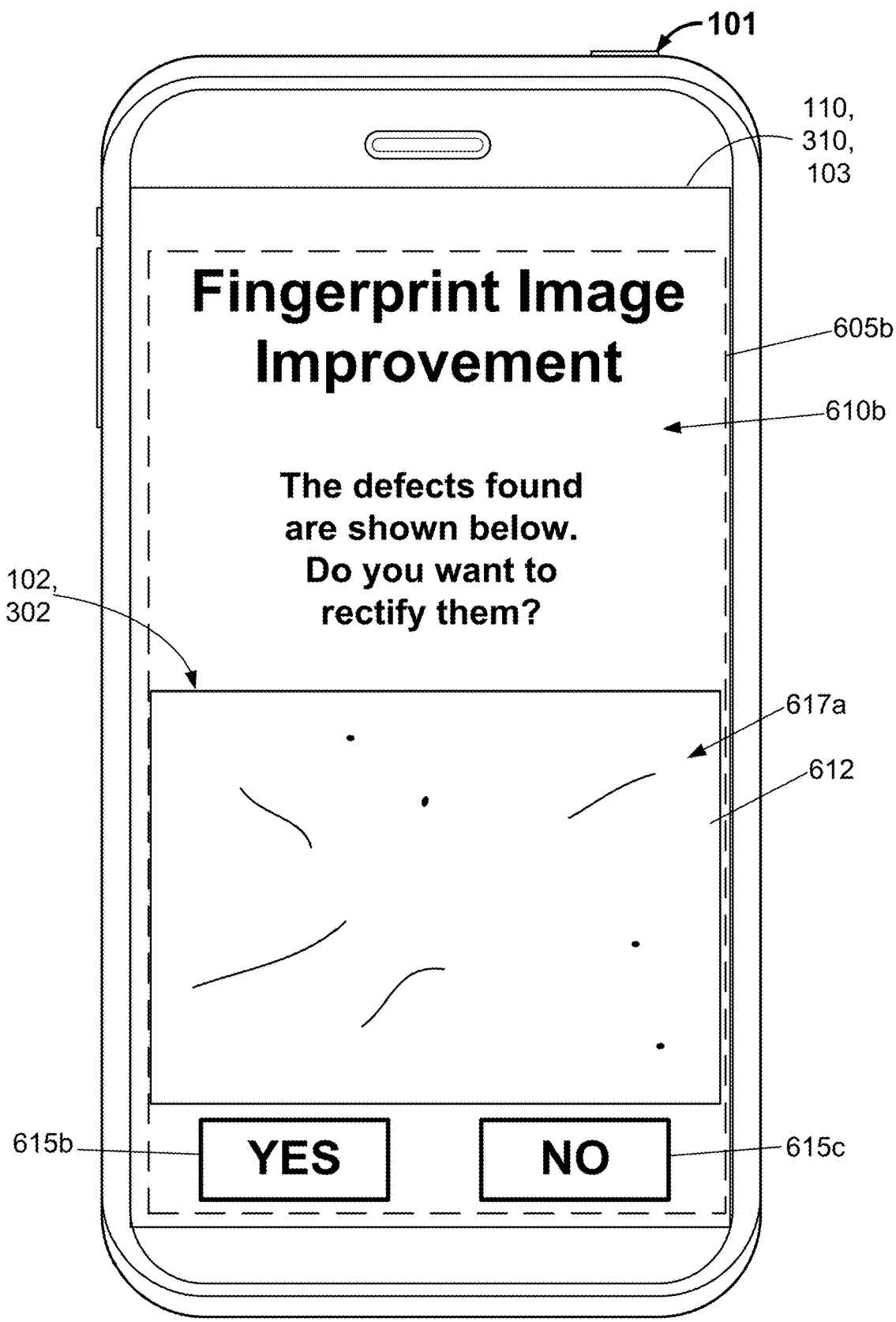

The GUI 605b shown in FIG. 6B is an example of a GUI that may be presented after a defect detection and mapping process. For example, the GUI 605b may be presented after the GUI 605a of FIG. 6A. According to this example, the GUI 605b includes a textual portion 610b, virtual buttons 615b and 615c, and a graphical portion 617a. Here, the textual portion 610b indicates that the graphical portion 617a indicates the defects found during the defect detection and mapping process referenced in the GUI 605a, and asks whether the user would like to rectify the defects. If the user would like to rectify the defects, the user may touch the virtual button 615b. If the user does not want to rectify the defects, the user may touch the virtual button 615c. In some examples, the control system may be configured to control the loudspeaker system 114 to provide one or more audio messages, which may correspond with the text of the textual portion 610b. In some examples, a user may provide a response via a voice command received by the microphone system 112 (not shown).

Figure 6C:
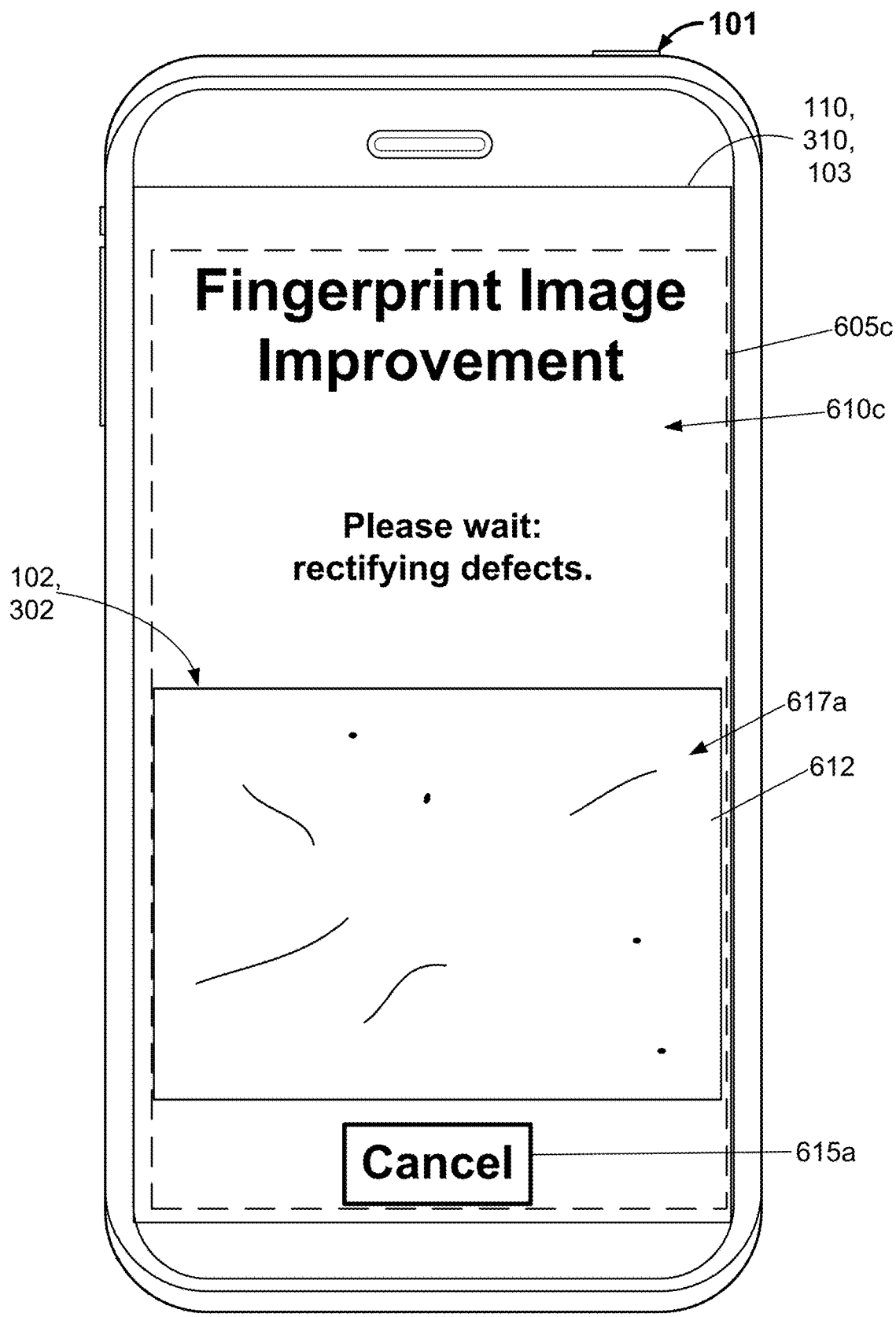

In this example, responsive to receiving an indication from the touch sensor system 103 of a touch in the area the virtual button 615b of FIG. 6B, the control system is configured to cause the display system 110 to present the GUI 605c shown in FIG. 6C. According to this example, the GUI 605c includes a textual portion 610c, a virtual button 615a and a graphical portion 617a. Here, the textual portion 610c includes an indication that at least some of the defects shown in graphical portion 617a are in the process of being rectified. In this example, a user may cancel the process by touching the virtual button 615a.

Figure 6D:
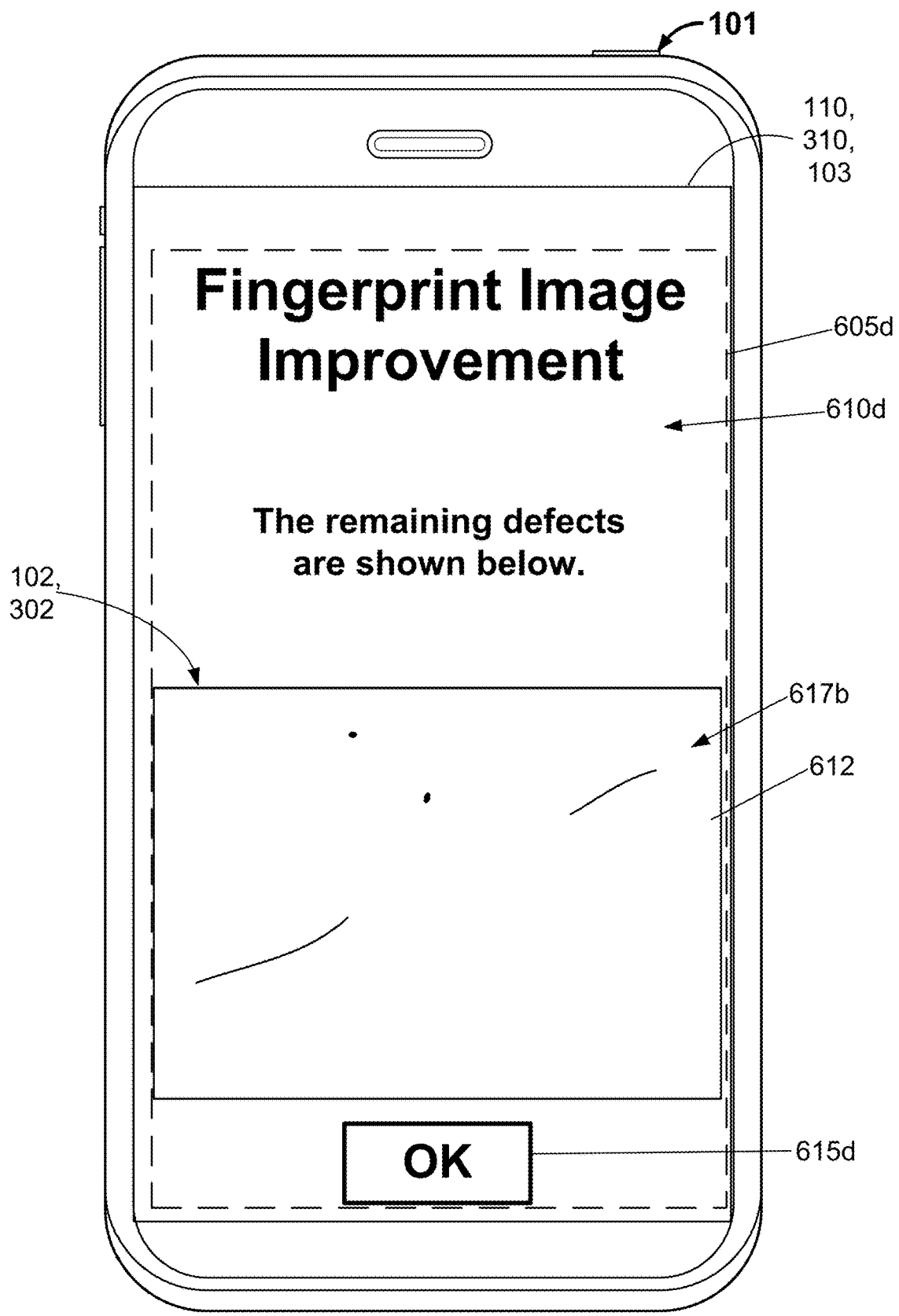

The GUI 605d shown in FIG. 6D is an example of a GUI that may be presented after the GUI 605c has been presented and after the rectification process referenced in the GUI 605c has been completed. According to this example, the GUI 605d includes a textual portion 610d, a virtual button 615d and a graphical portion 617b. Here, the textual portion 610d includes an indication that the defects shown in graphical portion 617b could not be rectified. In this example, a user may continue to another process, to another GUI, or both, by touching the virtual button 615d.

Figure 7:
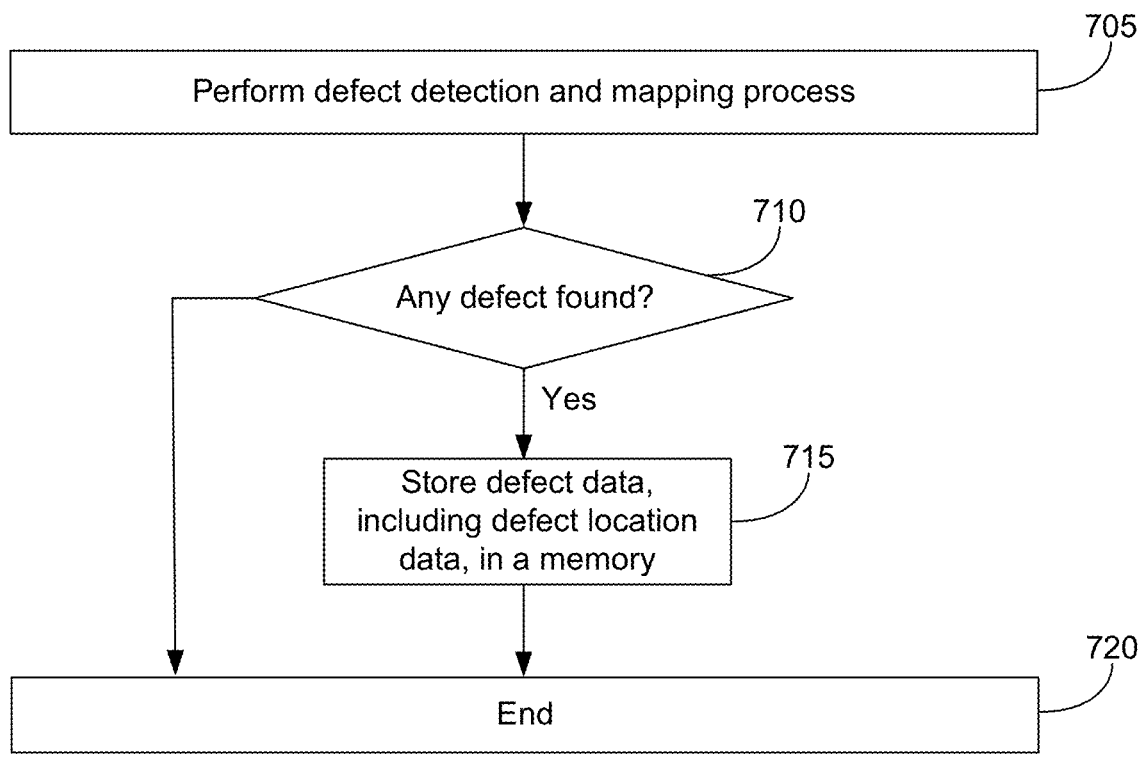
FIG. 7 is a flow diagram that presents examples of operations according to some additional disclosed methods.

FIG. 7 is a flow diagram that presents examples of operations according to some additional disclosed methods. The blocks of FIG. 7 may be performed by an apparatus that includes at least a fingerprint sensor system and a control system. The blocks of FIG. 7 may, for example, be performed by the apparatus 101 of FIG. 1 or by a similar apparatus. For example, in some implementations the control system 106 of FIG. 1 may be configured to perform, at least in part, the operations that are described herein with reference to FIG. 7. As with other methods disclosed herein, the methods outlined in FIG. 7 may include more or fewer blocks than indicated. Moreover, the blocks of methods disclosed herein are not necessarily performed in the order indicated. In some implementations, one or more blocks may be performed concurrently.

According to this example, method 700 involves a defect detection and mapping process. In this example, block 705 involves performing the defect detection and mapping process. According to this example, the defect detection and mapping process is based, at least in part, on fingerprint sensor data obtained by a fingerprint sensor system. Block 705 may involve one or more of the defect detection and mapping processes that are described with reference to FIG. 6A, or any other known defect detection and mapping process.

In this example, block 710 involves determining whether any defects were found in block 705. If not, the process ends in block 720. However, if it is determined in block 710 that one or more defects were found in block 705, the process continues to block 715. In this example, block 715 involves storing information regarding the one or more defects found in block 705, including defect location data, in a memory. The memory may, for example, be the memory system 108 of FIG. 1, or a portion thereof. The defect location data may, for example, be expressed according to a coordinate system, which may in some examples be with reference to an active fingerprint sensor area. The defect location data may, for example, include a set of two or more defect location points corresponding to each defect. In some examples, the location data for a defect may include more than two defect location points. For example, the location data for a defect may include a set of defect location points defining the outline of a defect, a set of defect location points defining a line or curve corresponding with a defect, etc.

Figure 8:
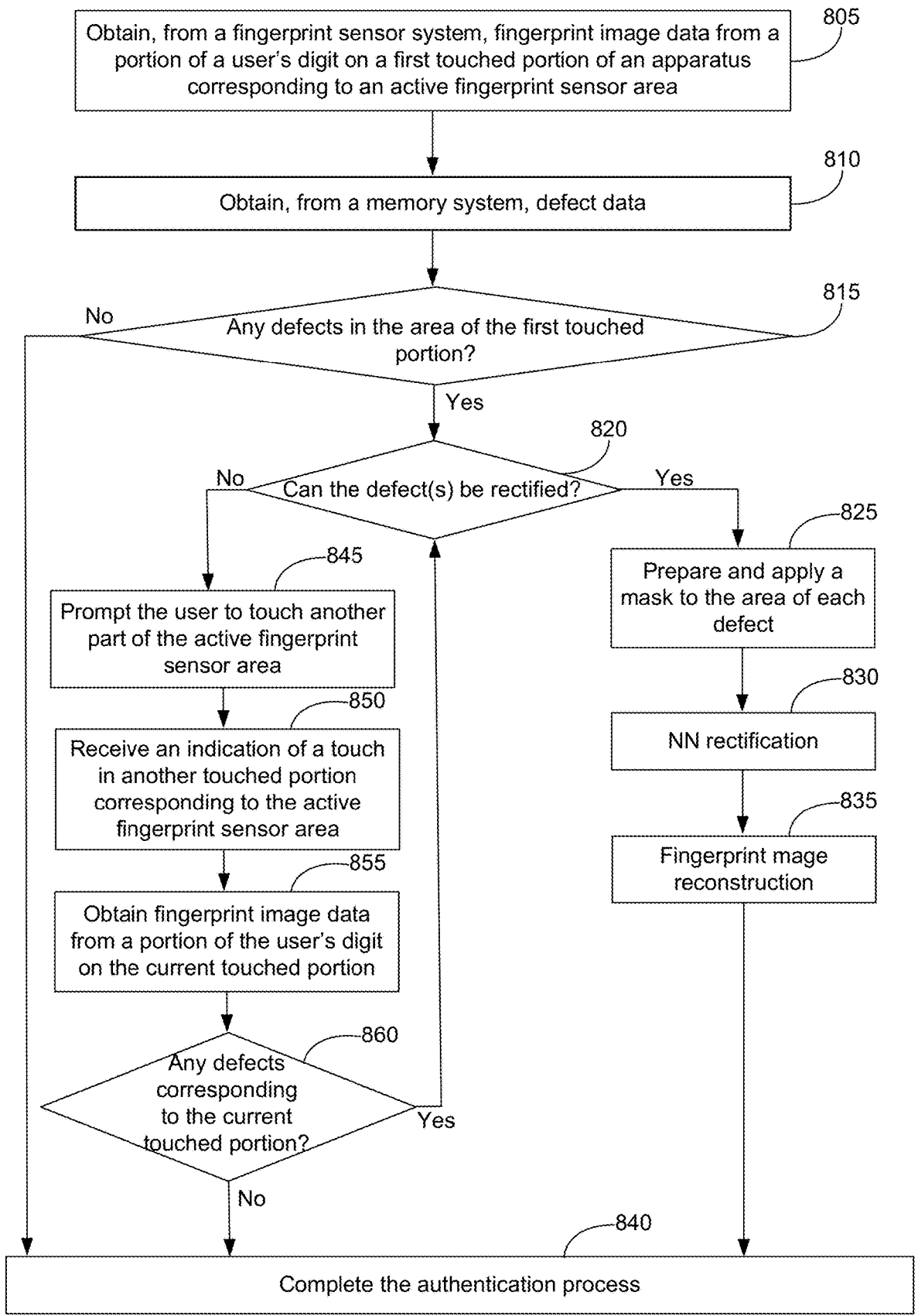
FIG. 8 is a flow diagram that presents examples of operations according to some additional disclosed methods.

FIG. 8 is a flow diagram that presents examples of operations according to some additional disclosed methods. The blocks of FIG. 8 may be performed by an apparatus that includes at least a fingerprint sensor system and a control system. The blocks of FIG. 8 may, for example, be performed by the apparatus 101 of FIG. 1 or by a similar apparatus. For example, in some implementations the control system 106 of FIG. 1 may be configured to perform, at least in part, the operations that are described herein with reference to FIG. 8. As with other methods disclosed herein, the methods outlined in FIG. 8 may include more or fewer blocks than indicated. Moreover, the blocks of methods disclosed herein are not necessarily performed in the order indicated. In some implementations, one or more blocks may be performed concurrently.

According to this example, method 800 involves using previously-obtained defect data. In some examples, method 800 may be performed in the context of a fingerprint-based authentication process. In this example, block 805 involves obtaining, from a fingerprint sensor system, fingerprint image data from a portion of a user's digit on a first touched portion of an apparatus corresponding to an active fingerprint sensor area. Block 805 may, in some examples, involve performing blocks 205 and 210 of FIG. 2.

In this example, block 810 involves obtaining, from a memory system, defect data. Block 810 may, in some examples, correspond with block 215 of FIG. 2. The memory system may, for example, be the memory system 108 of FIG. 1. The defect data may, for example, have been previously obtained via a process like that described with reference to FIG. 6A or FIG. 7. In this example, the defect data includes defect location data.

In this example, block 815 involves determining whether the defect data indicates any defects in the area corresponding to the first touched portion. Block 815 may, for example, involve determining coordinates that define an area of the first touched portion and determining whether the defect location data indicates any defects within the area of the first touched portion. In some alternative examples, block 815 may be performed before any fingerprint data are obtained from the first touched portion. For example, block 815 may be performed responsive to touch sensor data indicating the area of the first touched portion.

According to this example, if it is determined in block 815 that there are no defects in the area of the first touched portion, method 800 proceeds to block 840, which involves completing an authentication process. For example, current fingerprint minutiae may be extracted from the currently-obtained fingerprint image data from the portion of the user's digit. The current fingerprint minutiae may be compared to previously-obtained fingerprint minutiae, such as fingerprint minutiae obtained during an enrollment process. If there is a match between the current fingerprint minutiae and the previously-obtained fingerprint minutiae, the authentication process may conclude successfully. In some examples, method 800 also may include a liveness detection process, an anti-spoofing process, or a combination thereof.

However, if it is determined in block 815 that there are defects in the area of the first touched portion, method 800 proceeds to block 820, which involves determining whether the defects can be rectified. Block 820 may, in some examples, involve referring to saved results of a previous attempt to rectify one or more defects in the area of the first touched portion. Block 820 may, in some alternative examples, involve a current attempt to rectify one or more defects in the area of the first touched portion. According to some examples, block 820 may involve applying a threshold, such as a ratio of the size of one or more defects in the area of the first touched portion to the entire area of the first touched portion, a threshold involving a number of defects in in the area of the first touched portion that cannot be rectified, or a combination thereof.

In this example, if it is determined in block 820 that one or more defects in the area of the first touched portion cannot be rectified, the process continues to block 845. According to this example, block 845 involves prompting the user to touch another part of the active fingerprint sensor area. In some examples, block 845 may involve controlling a display device to present a GUI with a visual prompt, such as a textual prompt, to touch another part of the active fingerprint sensor area. In some such examples, the GUI may include a graphical prompt suggesting a particular portion of the active fingerprint sensor area for the user to touch, such as an area known to lack defects, an area known to lack defects that cannot be rectified, an area having fewer defects, an area having less severe defects (such as smaller defects), etc.

According to this example, 850 involves receiving an indication of a touch in another touched portion corresponding to the active fingerprint sensor area. In other words, block 850 involves receiving an indication, such as touch sensor data, indicating that the user has touched another part of the active fingerprint sensor area. The touch may have been responsive to the prompt of block 845.

In this example, block 855 involves obtaining fingerprint image data from a portion of the user's digit on the current touched portion. According to this example, block 860 involves determining whether there are any defects corresponding to the current touched portion. In some examples, block 860 may involve the same process as that of block 815. In some alternative examples, block 860 may be performed prior to block 855.

According to this example, if it is determined in block 860 that there are no defects in the area of the first touched portion, method 800 proceeds to block 840 and the authentication process will be completed, whether successfully or unsuccessfully. However, if it is determined in block 860 that there are defects in the area of the first touched portion, method 800 reverts to block 820 in this example.

In this example, if it is determined in block 820 that all defects in the area of the first touched portion can be rectified, the process continues to block 825. In some alternative examples, block 820 may involve determining whether at least one defect, but fewer than all defects, in the area of the first touched portion can be rectified. According to this example, block 825 involves preparing and applying a mask to the area of each defect within the touched portion. According to this example, the output of block 825 is masked fingerprint image data. In this example, the masked fingerprint image data is provided to a neural network that has been trained to estimate fingerprint image data corresponding to masked portions of fingerprint image data, in block 830.

For example, the neural network may have been trained to make representations of masked fingerprint image data in a latent space and to estimate complete versions of the fingerprint image data in the latent space, including fingerprint image data corresponding to the masked portions. In some such examples, the neural network may have been trained according to representations of unmasked fingerprint image data in the latent space that were used as "ground truth" or reference data. For example, the reference data and the estimated complete versions of the fingerprint image data may have been provided to a loss function, and the neural network may have been trained based on a loss function gradient. In some alternative examples, the neural network may have been trained to estimate only fingerprint image data corresponding to the masked portions. In some alternative examples, block 830 may be implemented by another type of machine learning process.

In this example, block 835 involves a fingerprint image reconstruction process that is based on the estimated fingerprint image data corresponding to the portions of the fingerprint image data that were masked in block 825. Block 835 may involve combining the estimated fingerprint image data corresponding to the masked portions-which are the output of block 830 in this example—with the unmasked portions of fingerprint image data. In some examples, block 835 may involve an image stitching process. According to this example, after the fingerprint image reconstruction process, method 800 proceeds to block 840.

Figure 9A:
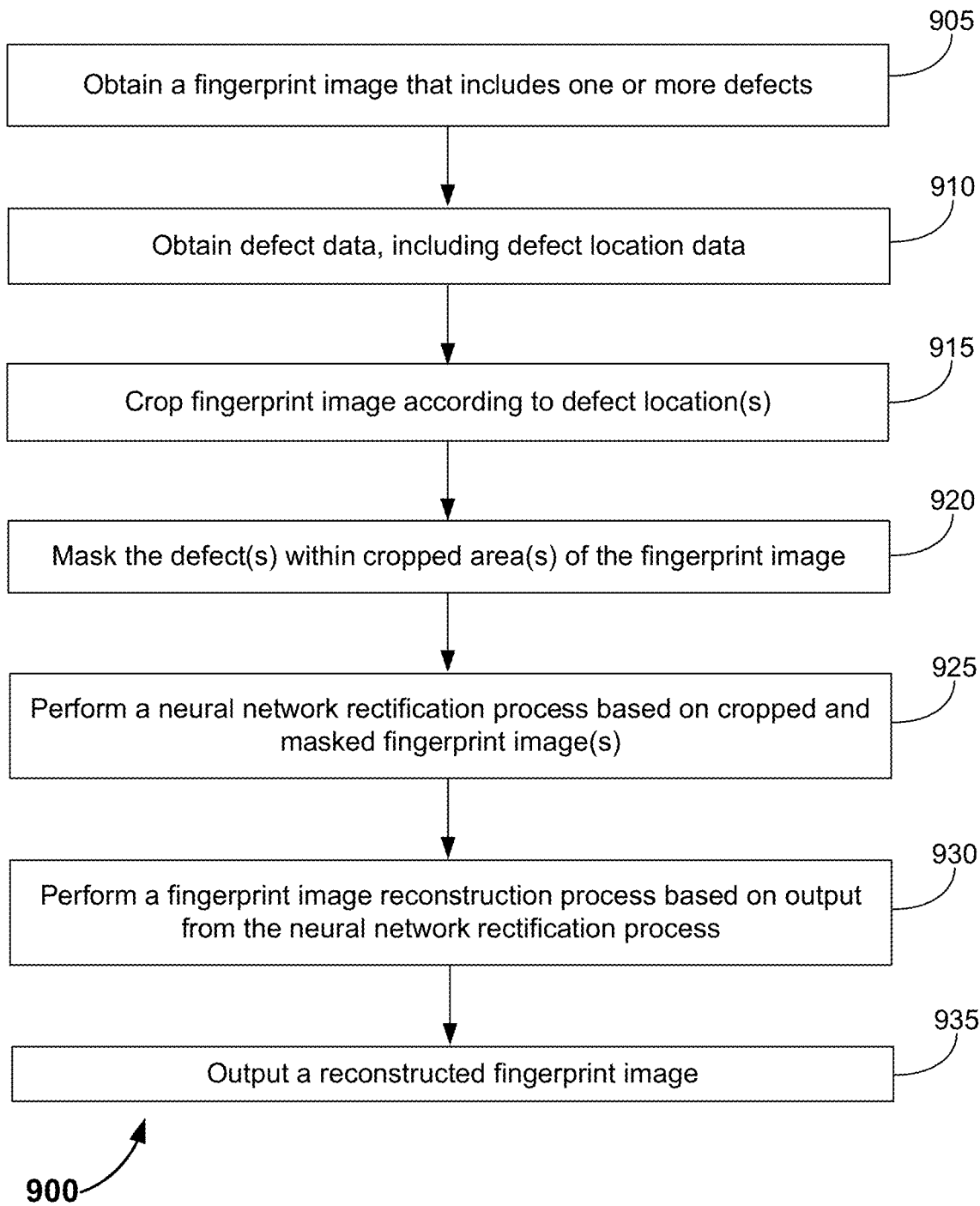
FIG. 9A is a flow diagram that presents examples of operations according to some additional disclosed methods.

FIG. 9A is a flow diagram that presents examples of operations according to some additional disclosed methods. FIGS. 9B, 9C, 9D and 9E show examples of fingerprint images that correspond to blocks of FIG. 9A. The blocks of FIG. 9A may be performed by an apparatus that includes at least a fingerprint sensor system and a control system. The blocks of FIG. 9A may, for example, be performed by the apparatus 101 of FIG. 1 or by a similar apparatus. For example, in some implementations the control system 106 of FIG. 1 may be configured to perform, at least in part, the operations that are described herein with reference to FIG. 9A. As with other methods disclosed herein, the methods outlined in FIG. 9A may include more or fewer blocks than indicated. Moreover, the blocks of methods disclosed herein are not necessarily performed in the order indicated. In some implementations, one or more blocks may be performed concurrently.

According to this example, method 900 involves a fingerprint image rectification and reconstruction processes. In some examples, blocks 910-935 of method 900 may be more detailed versions of blocks 825-835 of FIG. 8. According to some examples, method 900 may be performed in the context of a fingerprint-based authentication process.

Figure 9B:
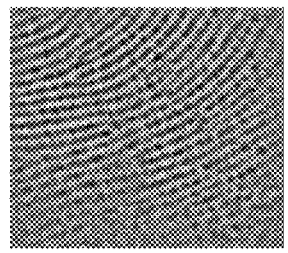
FIGS. 9B, 9C, 9D and 9E show examples of fingerprint images that correspond to blocks of FIG. 9A.

In this example, block 905 involves obtaining, for example from a fingerprint sensor system, a fingerprint image that includes one or more defects. Block 905 may, for example, involve obtaining fingerprint image data from a portion of a user's digit on a portion of an apparatus corresponding to an active fingerprint sensor area. Block 905 may, in some examples, involve performing blocks 205 and 210 of FIG. 2. FIG. 9B shows an example of a fingerprint image that may be obtained in block 905.

In this example, block 910 of FIG. 9A involves obtaining defect data. In this example, the defect data includes defect location data. In some examples, the defect data may be obtained from a memory system in block 910. The memory system may, for example, be the memory system 108 of FIG. 1. The defect data may, for example, have been previously obtained via a process like that described with reference to FIG. 6A or FIG. 7. In some alternative examples, new defect data may be obtained in block 910 according to a defect detection process, such as one of the detection processes disclosed herein.

In this example, block 915 involves cropping the fingerprint image according to one or more defect locations. In some examples, block 915 may involve cropping one or more n by m rectangular areas or one or more n by n square areas of the fingerprint image. In some examples of the latter process, block 915 may involve cropping out one or more 20 by 20 pixel areas of the fingerprint image, one or more 25 by 25 pixel areas of the fingerprint image, one or more 30 by 30 pixel areas of the fingerprint image, one or more 35 by 35 pixel areas of the fingerprint image, one or more 40 by 40 pixel areas of the fingerprint image, etc. In some examples, the size of a cropped area may correspond with the size of a defect. According to some examples, the size of a cropped area may correspond with the size of a cropped area used when training a neural network to perform a fingerprint image rectification process.

Figure 9C:
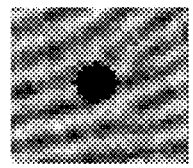

According to this example, block 920 involves masking one or more defects within one or more cropped areas. In some examples, block 920 may involve applying a circular mask to a defect within a cropped area. One such example is shown in FIG. 9C, in which a circular mask having a 4-pixel radius has been applied to a 32 pixel by 32 pixel cropped area of the fingerprint image of FIG. 9B. Other examples of block 920 may involve applying a different mask shape, such as a square mask shape, a rectangular mask shape, etc.

In this example, block 925 involves perform a neural network rectification process based on one or more cropped and masked fingerprint images. According to some examples, block 925 may involve providing one or more cropped and masked fingerprint images to a deep neural network that has been trained to perform a fingerprint image rectification process. In some examples, block 925 may correspond to block 830 of FIG. 8. In some examples, the output of block 925 may correspond with the masked area of each input cropped and masked fingerprint image. In other examples, the output of block 925 may correspond with the entire cropped area of each input cropped and masked fingerprint image.

Figure 9D:
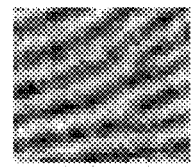

According to this example, block 930 involves performing a fingerprint image reconstruction process that is based on output from the neural network rectification process. In some examples, block 930 may involve a fingerprint image reconstruction process that is based on estimated fingerprint image data—in this example, estimated by the neural network in block 925—corresponding to the portions of the fingerprint image data that were masked in block 920. In some such examples, block 930 may involve combining the estimated fingerprint image data corresponding to the masked portions—which are the output of block 925 in this example—with the unmasked portions of fingerprint image data. In some alternative examples, block 930 may involve a fingerprint image reconstruction process that is based on estimated fingerprint image data corresponding to the entire cropped areas—in this example, estimated by the neural network in block 925—that were cropped in block 915. FIG. 9D shows an example of a reconstructed cropped area corresponding to the masked and cropped area shown in FIG. 9C.

Figure 9E:
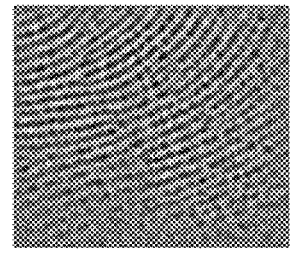

In some examples, block 930 of FIG. 9A may involve combining reconstructed cropped areas with the remaining portions of the fingerprint image that was obtained in block 905. In some examples, block 930 may involve an image stitching process. According to this example, after the fingerprint image reconstruction process, a reconstructed fingerprint image is output on block 935. FIG. 9E shows an example of a reconstructed fingerprint image that may be output in block 935. The reconstructed fingerprint image of FIG. 9E corresponds with the input fingerprint image shown in FIG. 9B.

In some examples, method 900 also may include an authentication process. For example, current fingerprint minutiae may be extracted from the reconstructed fingerprint image output in block 935. The current fingerprint minutiae may be compared to previously-obtained fingerprint minutiae, such as fingerprint minutiae obtained during an enrollment process. If there is a match between the current fingerprint minutiae and the previously-obtained fingerprint minutiae, the authentication process may conclude successfully. In some examples, method 900 also may include a liveness detection process, an anti-spoofing process, or a combination thereof.

FIGS. 10A, 10B and 10C show examples of fingerprint images before and after a fingerprint image reconstruction process. The fingerprint image reconstruction process may, for example, correspond with one of the fingerprint image reconstruction processes that are disclosed herein. FIG. 10A shows a fingerprint image that includes three defective areas. The defects in the defective areas may, for example, correspond to defects of the fingerprint sensor system used to obtain the fingerprint image, defects in an overlying display stack, defects in a cover layer, or combinations thereof. The locations of the defective areas may, for example, be included in defect data retrieved from a memory, such as described with reference to block 810 of FIG. 8. In some examples, a control system may already have determined whether the defects corresponding to the defective areas could be rectified, such as described with reference to block 820 of FIG. 8.

FIG. 10B shows examples of masks that are obscuring the three defective areas shown in FIG. 10A. The mask shapes and sizes are merely examples. In other examples, one or more of the masks may have a different shape, such as a square shape, a rectangular shape, or another shape. It is generally advantageous to minimize the masked portions of fingerprint images that do not correspond to defective areas. The masks may, for example, have been applied according to block 825 of FIG. 8.

FIG. 10C shows an example of the fingerprint image of FIGS. 10A and 10B after a fingerprint image reconstruction process. The fingerprint image reconstruction process may, for example, correspond with blocks 830 and 835 of FIG. 8.

Implementation examples are described in the following numbered clauses:

1. An apparatus, including: a fingerprint sensor system; a memory system; and a control system configured for communication with the fingerprint sensor system, the control system being further configured to: control the fingerprint sensor system to scan a portion of a user's digit on a surface of the apparatus corresponding to a touched portion of an active fingerprint sensor area; obtain, from the fingerprint sensor system, fingerprint image data corresponding to the portion of the user's digit; obtain, from the memory system, defect data identifying one or more defective areas corresponding to the active fingerprint sensor area; determine whether the defect data indicates one or more defective areas corresponding to the touched portion of the active fingerprint sensor area from which the fingerprint image data were obtained; responsive to determining that the defect data indicates one or more defective areas corresponding to the touched portion of the active fingerprint sensor area, determine whether fingerprint image data corresponding to the one or more defective areas can be rectified; and responsive to determining that fingerprint image data corresponding to the one or more defective areas can be rectified, rectifying the fingerprint image data corresponding to the one or more defective areas.

2. The apparatus of clause 1, further including a display system and a touch sensor system corresponding with at least a portion of the display system, where the control system is further configured to control the display system to present a graphical user interface (GUI).

3. The apparatus of clause 2, where the control system is further configured to obtain the defect data responsive to user input via the GUI.

4. The apparatus of clause 2 or clause 3, where the GUI includes a visual prompt asking whether a user would like to initiate a rectification process.

5. The apparatus of clause 4, where the control system is configured to control the display system to present the GUI responsive to one or more indications of decreased fingerprint sensor system performance.

6. The apparatus of any one of clauses 2-5, where the GUI includes a visual prompt to place the user's digit on a surface of the apparatus corresponding to a different portion of the active fingerprint sensor area and where the control system is configured to control the display system to present the GUI responsive to determining that fingerprint image data corresponding to the one or more defective areas cannot be rectified.

7. The apparatus of any one of clauses 1-6, where rectifying the fingerprint image data involves a fingerprint image reconstruction process.

8. The apparatus of clause 7, where the fingerprint image reconstruction process is performed by a neural network implemented by the control system.

9. The apparatus of clause 8, where the neural network has been trained to reconstruct fingerprint images having masked-off or missing portions.

10. The apparatus of any one of clauses 7-9, where the control system is configured to mask fingerprint image data corresponding to the one or more defective areas prior to initiating the fingerprint image reconstruction process.

11. The apparatus of any one of clauses 1-10, where the control system is further configured to obtain the defect data and to store the defect data in the memory system.

12. The apparatus of clause 11, where obtaining the defect data involves: controlling the fingerprint sensor system to obtain multiple fingerprint sensor images, each of the fingerprint sensor images being obtained with a different set of fingerprint sensor settings; and comparing the multiple fingerprint sensor images to identify one or more defective areas corresponding to the active fingerprint sensor area.

13. A method, including: controlling a fingerprint sensor system to scan a portion of a user's digit on a surface of an apparatus corresponding to a touched portion of an active fingerprint sensor area; obtaining, from the fingerprint sensor system, fingerprint image data corresponding to the portion of the user's digit; obtaining, from a memory system, defect data identifying one or more defective areas corresponding to the active fingerprint sensor area; determining whether the defect data indicates one or more defective areas corresponding to the touched portion of the active fingerprint sensor area from which the fingerprint image data were obtained; responsive to determining that the defect data indicates one or more defective areas corresponding to the touched portion of the active fingerprint sensor area, determining whether fingerprint image data corresponding to the one or more defective areas can be rectified; and responsive to determining that fingerprint image data corresponding to the one or more defective areas can be rectified, rectifying the fingerprint image data corresponding to the one or more defective areas.

14. The method of clause 13, further including controlling a display system to present a graphical user interface (GUI).

15. The method of clause 14, further including obtaining the defect data responsive to user input via the GUI.

16. The method of clause 14 or clause 15, where the GUI includes a visual prompt asking whether a user would like to initiate a rectification process.

17. The method of clause 16, further including controlling the display system to present the GUI responsive to one or more indications of decreased fingerprint sensor system performance.

18. The method of any one of clauses 13-17, further including obtaining the defect data and storing the defect data in the memory system.

19. The method of any one of clauses 13-18, where rectifying the fingerprint image data involves a fingerprint image reconstruction process.

20. An apparatus, including: a fingerprint sensor system; a memory system; and control means for: controlling the fingerprint sensor system to scan a portion of a user's digit on a surface of the apparatus corresponding to a touched portion of an active fingerprint sensor area; obtaining, from the fingerprint sensor system, fingerprint image data corresponding to the portion of the user's digit; obtaining, from the memory system, defect data identifying one or more defective areas corresponding to the active fingerprint sensor area; determining whether the defect data indicates one or more defective areas corresponding to the touched portion of the active fingerprint sensor area from which the fingerprint image data were obtained; responsive to determining that the defect data indicates one or more defective areas corresponding to the touched portion of the active fingerprint sensor area, determining whether fingerprint image data corresponding to the one or more defective areas can be rectified; and responsive to determining that fingerprint image data corresponding to the one or more defective areas can be rectified, rectifying the fingerprint image data corresponding to the one or more defective areas.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
a fingerprint sensor system;
a memory system;
a user interface system; and
a control system configured for communication with the fingerprint sensor system, the control system being further configured to:
control the fingerprint sensor system to scan a portion of a user's digit on a surface of the apparatus corresponding to a touched portion of an active fingerprint sensor area;
obtain, from the fingerprint sensor system, fingerprint image data corresponding to the portion of the user's digit;
obtain, from the memory system, defect data identifying one or more defective areas corresponding to the active fingerprint sensor area;
determine whether the defect data indicates one or more defective areas corresponding to the touched portion of the active fingerprint sensor area from which the fingerprint image data were obtained;
responsive to determining that the defect data indicates one or more defective areas corresponding to the touched portion of the active fingerprint sensor area, determine whether fingerprint image data corresponding to the one or more defective areas can be rectified;
responsive to determining that fingerprint image data corresponding to the one or more defective areas cannot be rectified, cause the user interface system to provide a prompt to place the user's digit on a surface of the apparatus corresponding to another part of the active fingerprint sensor area; and
responsive to determining that fingerprint image data corresponding to the one or more defective areas can be rectified, rectify the fingerprint image data corresponding to the one or more defective areas.

2. The apparatus of claim 1, further comprising a display system and a touch sensor system corresponding with at least a portion of the display system, wherein the control system is further configured to control the display system to present a graphical user interface (GUI).

3. The apparatus of claim 2, wherein the control system is further configured to obtain the defect data responsive to user input via the GUI.

4. The apparatus of claim 2, wherein the GUI includes a visual prompt asking whether a user would like to initiate a rectification process.

5. The apparatus of claim 4, wherein the control system is configured to control the display system to present the GUI responsive to one or more indications of decreased fingerprint sensor system performance.

6. The apparatus of claim 2, wherein the user interface system comprises the display system and wherein causing the user interface system to provide the prompt comprises control the display system to present a GUI including a visual prompt to place the user's digit on the surface of the apparatus corresponding to the different portion of the active fingerprint sensor area.

7. The apparatus of claim 1, wherein rectifying the fingerprint image data involves a fingerprint image reconstruction process.

8. The apparatus of claim 7, wherein the fingerprint image reconstruction process is performed by a neural network implemented by the control system.

9. The apparatus of claim 8, wherein the neural network has been trained to reconstruct fingerprint images having masked-off or missing portions.

10. The apparatus of claim 7, wherein the control system is configured to mask fingerprint image data corresponding to the one or more defective areas prior to initiating the fingerprint image reconstruction process.

11. The apparatus of claim 1, wherein the control system is further configured to obtain the defect data and to store the defect data in the memory system.

12. The apparatus of claim 11, wherein obtaining the defect data involves:
controlling the fingerprint sensor system to obtain multiple fingerprint sensor images, each of the fingerprint sensor images being obtained with a different set of fingerprint sensor settings; and
comparing the multiple fingerprint sensor images to identify one or more defective areas corresponding to the active fingerprint sensor area.

13. A method, comprising:
controlling a fingerprint sensor system to scan a portion of a user's digit on a surface of an apparatus corresponding to a touched portion of an active fingerprint sensor area;
obtaining, from the fingerprint sensor system, fingerprint image data corresponding to the portion of the user's digit;
obtaining, from a memory system, defect data identifying one or more defective areas corresponding to the active fingerprint sensor area;
determining whether the defect data indicates one or more defective areas corresponding to the touched portion of the active fingerprint sensor area from which the fingerprint image data were obtained;
responsive to determining that the defect data indicates one or more defective areas corresponding to the touched portion of the active fingerprint sensor area, determining whether fingerprint image data corresponding to the one or more defective areas can be rectified; and
responsive to determining that fingerprint image data corresponding to the one or more defective areas cannot be rectified, causing the user interface system to provide a prompt to place the user's digit on a surface of the apparatus corresponding to another part of the active fingerprint sensor area.

14. The method of claim 13, wherein causing the user interface system to provide the prompt comprises controlling a display system to present a graphical user interface (GUI).

15. The method of claim 14, further comprising obtaining the defect data responsive to user input via the GUI.

16. The method of claim 13, further comprising obtaining the defect data and storing the defect data in the memory system.

17. An apparatus, comprising:
a fingerprint sensor system;
a memory system;
a user interface system; and
control means for:
controlling the fingerprint sensor system to scan a portion of a user's digit on a surface of the apparatus corresponding to a touched portion of an active fingerprint sensor area;

obtaining, from the fingerprint sensor system, fingerprint image data corresponding to the portion of the user's digit;

obtaining, from the memory system, defect data identifying one or more defective areas corresponding to the active fingerprint sensor area;

determining whether the defect data indicates one or more defective areas corresponding to the touched portion of the active fingerprint sensor area from which the fingerprint image data were obtained;

responsive to determining that the defect data indicates one or more defective areas corresponding to the touched portion of the active fingerprint sensor area, determining whether fingerprint image data corresponding to the one or more defective areas can be rectified;

responsive to determining that fingerprint image data corresponding to the one or more defective areas cannot be rectified, cause the user interface system to provide a prompt to place the user's digit on a surface of the apparatus corresponding to another part of the active fingerprint sensor area; and responsive to determining that fingerprint image data corresponding to the one or more defective areas can be rectified, rectifying the fingerprint image data corresponding to the one or more defective areas.

\* \* \* \* \*